Sept. 8, 1931.      V. G. APPLE      1,822,263
DYNAMO ELECTRIC MACHINE
Filed June 14, 1928      2 Sheets-Sheet 1

INVENTOR.

Sept. 8, 1931.  V. G. APPLE  1,822,263
DYNAMO ELECTRIC MACHINE
Filed June 14, 1928   2 Sheets-Sheet 2
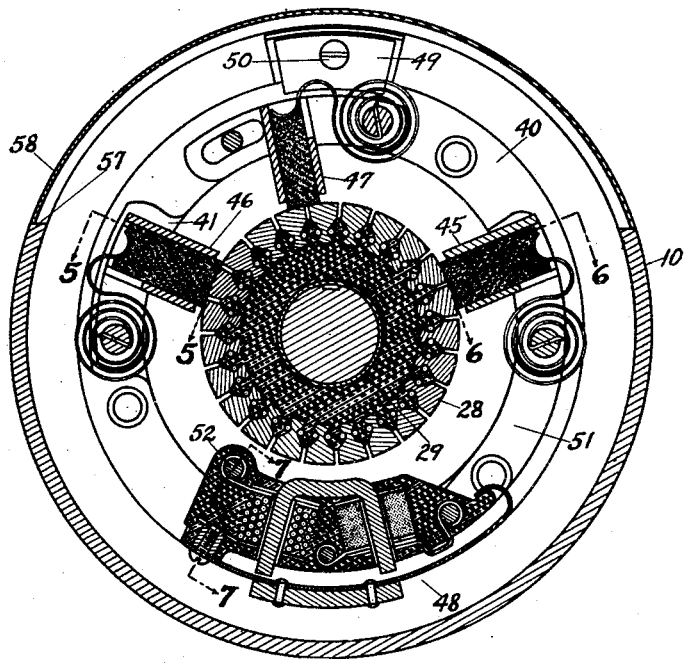
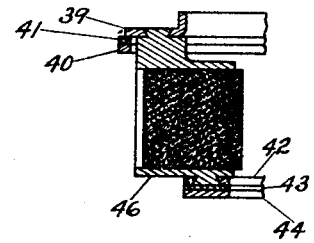
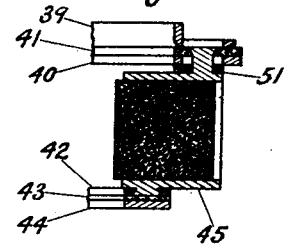
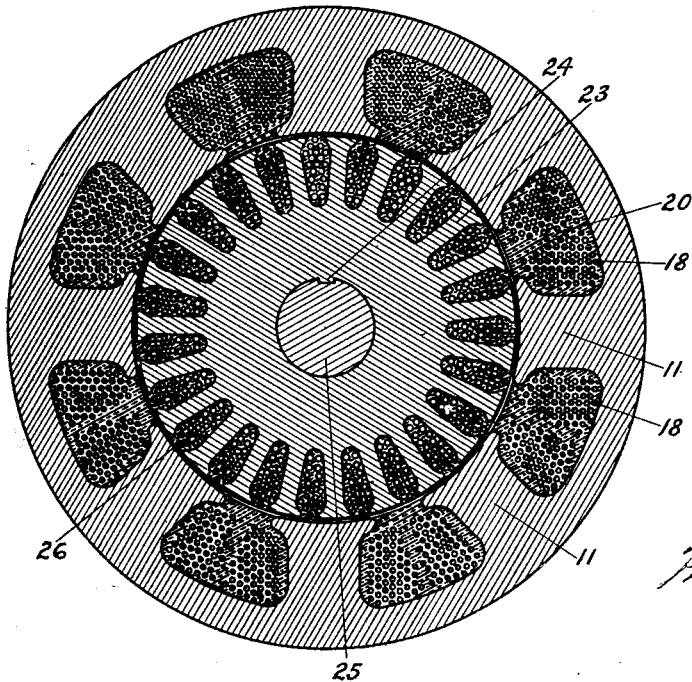
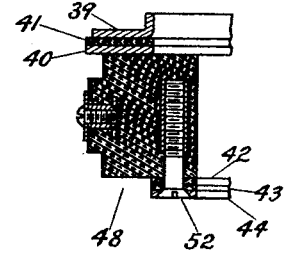
INVENTOR.
Vincent G. Apple Patented Sept. 8, 1931

1,822,263

UNITED STATES PATENT OFFICE

VINCENT G. APPLE, OF DAYTON, OHIO

DYNAMO ELECTRIC MACHINE

Application filed June 14, 1928. Serial No. 285,365.

My invention relates more particularly to improvements in that type of dynamo electric machine which operates at a more or less variable current output yet must deliver current against a substantially constant resistance, and one object of my invention is to provide a dynamo having as part thereof means of preventing the current strength from reaching too high a value and means of opening the charging circuit of the dynamo when its current strength has reached a value so low as to be overcome by the aforesaid substantially constant resistance.

Another object is to provide a dynamo wherein the several elements are so constructed that suitable connection may be had therebetween without having any exposed or visible wires connecting one to another.

Another object is to provide a dynamo wherein all windings and all terminals thereof are imbedded in a solid mass of insulating material to hold them in fixed relation and to protect them against the effect of contact with oil or moisture or against breakage or other injury.

Other objects will be apparent from the following detailed description, reference being had to the drawings wherein—

Fig. 3 is a cross section taken at 3—3 Fig. 1.

Fig. 4 is a cross section taken at 4—4 Fig. 1.

Fig. 5 is a fragmentary cross section at 5—5, Fig. 3.

Fig. 6 is a fragmentary cross section at 6—6, Fig. 3.

Fig. 7 is a fragmentary cross section at 7—7, Fig. 3.

Similar numerals refer to similar parts thruout the drawings.

Figure 1:
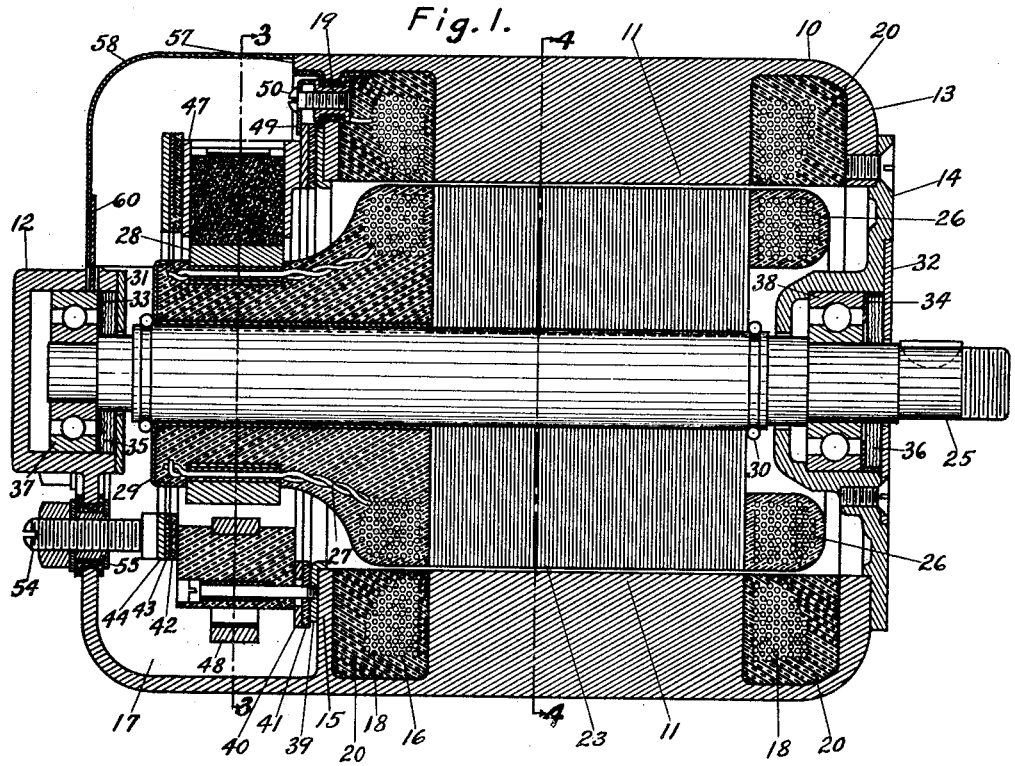
Fig. 1 is a longitudinal, vertical cross section thru my improved dynamo.
Figure 2:
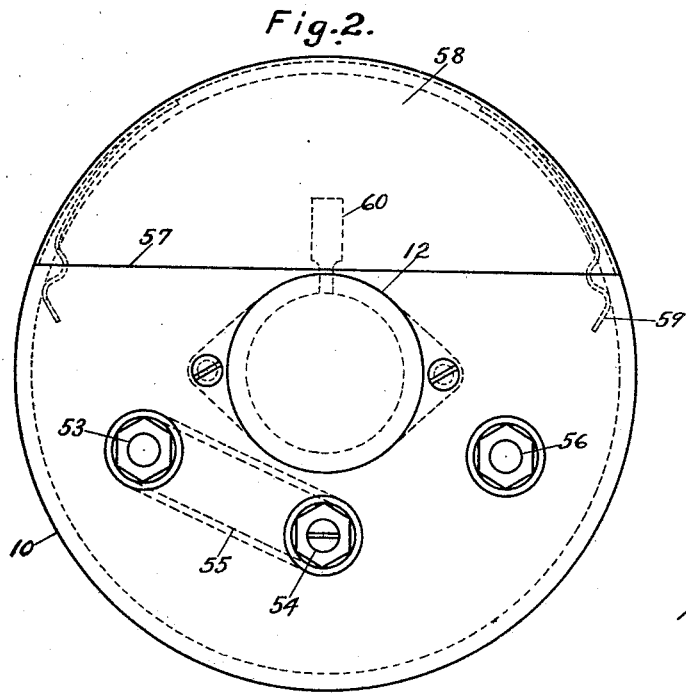
Fig. 2 is an end view.

A frame 10 has a series of poles 11, 11 etc. One end of frame 10 is substantially closed and carries hub 12, the other end being partially closed by flange 13 which supports bearing head 14. A partition 15 extends inwardly from frame 10 dividing it into two compartments 16 and 17. Coils 18 wound about poles 11 are, in the instant case, connected in series with each other, one end of said series being connected to contact 19 which is securely fastened to, but electrically insulated from frame 10, the other end being electrically connected to said frame. If desired more contacts 19 may be supplied so that coils 18 may be connected in parallel and the circuit which, in the instant case, has one end connected to the frame may have both ends thereof connected to insulated terminals similar to terminal 19.

Prior to winding the coils about poles 11, the frame is bored thru flange 13, poles 11, and partition 15 so that after the coils are in position a cylindrical plug may be inserted to extend thru the bored portions and a fluid insulating material may then be poured or pumped into the space left by said coils and hardened or allowed to harden by heat or otherwise to form a solid mass wherein insulating material extends about and between the wires of said coils, as at 20, which binds them in position and protects them from the effects of moisture, oil, vibration and physical injury. After the insulating material is sufficiently hard the plug is removed from the frame and compartment 16 comprising the field element is complete, leaving compartment 17 available to contain other necessary parts of the dynamo.

The armature, which is of suitable diameter to clear within poles 11, has a core composed of a plurality of laminæ 23 cemented together. An integral key portion 24 extends inwardly into the bore of each laminæ and together they form a key the entire length of the core to prevent turning movement on shaft 25. Windings 26 are laid in openings in the core as in ordinary practice, a suitable number of leads 27 being allowed to extend from the windings. Commutator bars 28 corresponding in number to the number of leads are provided one bar being suitably joined to each lead. The structure is then placed in a mold, the mold being so constructed that all parts of the armature are thereby held in correct relation and a treatment similar to that given the field is applied, namely, pouring or pumping a fluid insulating material into the space left by the other parts of the armature to fill all voids within the mold not occupied by said other parts, and at the same time to encase the armature in an armor of insulating material for protection against the effect of moistures, oil, vibration and other injuries.

The flanged ferrule 29 which is assembled within the mold with the other parts assists in keeping the core properly located while molding is being effected and affords protection for the end of the armature afterward. The commutator bars may contain notches or grooves or they may be otherwise formed to better engage the insulating material to retain their position under centrifugal action.

Split rings 30 are sprung over the shaft until they rest in grooves therein to hold the armature against endwise movement, and by removing these rings the shaft may be renewed when necessary. Plates 31 and 32 enclose hub 12 and bearing head 14. Metal washer 33 and metal cup 34 keep felt packing washers 35 and 36 from coming in contact with ball bearings 37 and 38, the felt packing washers retaining the oil supply to keep the bearings lubricated and excluding dust therefrom.

One of the improved features of my dynamo consists in the form and arrangements of the brush carrying ring which supports not only the current collecting and regulating brush holders usual in this type of dynamo but the cutout or valve as well which in ordinary practice is applied as an accessory and is usually connected by wires somewhere in the circuit. In the embodiment shown one series of rings 39 and 40 of metal and 41 of insulating material and another series 42 and 43 of insulating material and 44 of metal hold therebetween the collecting brush holders 45 and 46, the regulating brush holder 47 and the cutout unit 48. Ring 39 is in contact with frame 10, ring 40 connects to the field winding 18 thru clamp 49 and screw 50, brush holder 45 connects to cutout 48 thru metal segment 51, brush holder 46 is mounted on metal ring 39, brush holder 47 is mounted to be circumferentially adjustable on metal ring 40, cutout 48 connects to metal ring 44 thru screw 52, metal ring 44 connects to insulated binding post 53 thru insulated screw 54 and insulated strip 55 and the other binding post 56 is grounded to the frame.

It may be readily seen that with the arrangement shown screws 50 and 54 may be loosened and the ring turned to any position about the axis of the dynamo for adjustment or inspection and tightened to hold any position desired without affecting the circuit, and that this is accomplished without any loose or exposed wires or flexible leads commonly used to gain a similar result. A portion of frame 10 may be cut away as at 57 or otherwise for convenient access to the parts therein and a lid 58 held by spring snaps 59 and 60 may close the opening when desired.

While I have herein shown and described the best and most approved embodiment of my improved dynamo of which I am now aware it is to be understood that combinations embodying any portion of the improved features herein contained will come within the scope of my invention, as for instance, when desirable, the cutout unit may be omitted from the structure by simply extending the rivet in positive brush holder 45 thru into ring 44, or in constant speed dynamo both cutout unit and regulating brush may be omitted by riveting said positive brush holder 45 on the one side to ring 44 and on the other side to ring 40, the changes from the embodiment shown in either case being slight, and while I show as one of the improved features of my invention a brush carrying means which is revolvable completely about the dynamo axis for adjustment, similar means having limited or no adjustment when mounted on a partition in the dynamo frame as in the present embodiment are considered to provide a combination of considerable value.

In my copending applications, Serial Nos. 285,364 and 285,367, both filed June 14th, 1928, I show and claim the brush mechanism and the field element respectively herein disclosed, and I therefore do not herein claim these individual features, but rather limit myself to such combinations thereof as together produce a useful result, such combinations being set forth in the following wherein I claim—

1. The combination, in a dynamo electric machine, of a frame divided into two compartments by a partition therewithin, a metallic terminal carried in fixed relation on and extending thru but electrically insulated from said partition, a field winding in the one compartment electrically connected to said terminal, and a somewhat circular metallic brush carrying member in the other compartment rotatably mounted on said partition but electrically insulated therefrom, the circular member being adapted to contact said terminal to convey current equally well between the said brush and the field winding at any point to which said circular member may be rotated.

2. The combination, in a dynamo electric machine, of a frame divided into two compartments by a partition therewithin, a metallic terminal carried in fixed position on, and extending thru, but electrically insulated from said partition, a field winding in the one compartment electrically connected to said terminal, a somewhat circular metallic brush carrying member in the other compartment mounted for complete rotative adjustment on said partition electrically insulated therefrom, the said member being in contact with said terminal to convey current equally well to the brush thereon at any point of rotation, and a screw to lock said circular member against rotation.

3. The combination, in a dynamo electric machine, of a frame divided into two compartments by a partition therewithin, a field winding in the one compartment, a somewhat circular member in the other compartment mounted for complete rotatable adjustment on said partition said circular member being composed of layers of conductive material electrically separated from each other, a terminal mounted in fixed position on, but electrically insulated from, said frame, said terminal having fixed electrical connection to said field winding and one of said layers having movable electrical connection with said terminal, another layer being in movable electrical connection with said frame, a brush mounted on each of said layers and means to connect said brushes to the external circuit.

4. The combination, in a dynamo electric machine of variable current output, of a frame divided into two compartments by a partition therewithin, a field winding in the one compartment, one end of which is connected to said frame, a somewhat circular member in the other compartment mounted for complete rotatable adjustment on said partition, said rotatable member comprising layers of conductive material electrically separated from each other, a terminal mounted in fixed position on and extending thru but electrically insulated from said partition, said terminal having fixed electrical connection to the other end of said field winding and one of said layers having movable electrical connection with said terminal and a regulating brush circumferentially adjustable therewith, a second of said layers having a negative brush electrically connected thereto and a third layer having a positive brush electrically connected thereto, said second layer being in movable electrical contact with said frame, means to hold the circular member in any position within its scope of adjustment and means to connect the positive and negative brushes with the external circuit.

5. The combination, in a dynamo electric machine of variable current output, of a frame divided into two compartments by a partition therewithin, a field winding in the other compartment, one end of which is connected to said frame, a somewhat circular member in the other compartment mounted for complete rotatable adjustment on said partition, said rotatable member comprising layers of conductive material electrically separated from each other, a terminal mounted in fixed position on and extending thru but electrically insulated from said partition, said terminal having fixed electrical connection to the other end of said field winding, and one of said layers having movable electrical connection with said terminal and a regulating brush circumferentially adjustable therewith, a second of said layers having a negative brush and a third of said layers a positive brush electrically connected thereto, said second layer being in movable electrical contact with said frame, a second terminal mounted in fixed position on and extending thru but electrically insulated from the outer wall of said frame, said second terminal making electrical contact with the third of said layers to convey current to the electrical circuit and a means to complete the external circuit by grounding to said frame.

6. The combination, in a dynamo electric machine of variable current output, of a frame divided into two compartments by a partition therewithin, a field winding in the one compartment, one end of which is connected to said frame, a somewhat circular member in the other compartment mounted for complete rotatable adjustment on said partition, said rotatable member comprising layers of conductive material electrically separated from each other, a terminal mounted in fixed position on and extending thru but electrically insulated from said partition, said terminal having fixed electrical connection to the other end of said field winding, and one of said layers having movable electrical connection with said terminal and a regulating brush circumferentially adjustable therewith, a second of said layers having a negative brush and a third of said layers having a reverse current coil electrically connected thereto said second layer being in movable electrical contact with said frame, a positive brush mounted on said circular member but electrically insulated therefrom said positive brush being connected to the voltage coil by a metal strip, a second terminal mounted in fixed position on and extending thru but electrically insulated from the outer wall of said frame, said second terminal making electrical contact with the third of said layers to convey current to the external circuit and a means to complete the external circuit by grounding to said frame.

7. The combination, in a dynamo electric machine, of a frame divided into two compartments by a partition therewithin, a field winding in the first compartment, the terminal of which carried in fixed position by said partition communicates with the second compartment, said winding being imbedded in a solid casing of insulating material which fills all voids in the first compartment not occupied by said winding, and brush carrying means mounted on the partition in the second compartment connected to said field winding thru said terminal.

8. The combination, in a dynamo electric machine of a hollow, non-rotatable frame having integral inturned ends and an integral inwardly extending partition intermediate said ends separating the space within into two compartments, an insulated terminal supported on said partition, a field winding in the one compartment connected to the said terminal, and a brush rigging in the other compartment supported on said partition and connected to said terminal.

9. The combination, in a dynamo electric machine, of a hollow, non-rotatable frame having integral inturned ends and an integral inwardly extending partition intermediate said ends, separating the space within into a winding and a commutating compartment, an armature within said frame having a bearing supported in each inturned end, a winding in the winding compartment and a commutator extending through an opening in said partition into the communicating compartment, a field winding in the winding compartment and brush rigging supported on the said partition and surrounding the commutator in the commutating compartment.

In testimony whereof I hereunto set my hand.

VINCENT G. APPLE.